(12) United States Patent
Bhatnagar et al.

(10) Patent No.: US 12,126,499 B1
(45) Date of Patent: Oct. 22, 2024

(54) MODELLING ARCHITECTURE AS DATA WITH OPINIONATED ARCHITECTURE PATTERNS AND RECOMMENDATIONS

(71) Applicant: Morgan Stanley Services Group Inc., New York, NY (US)

(72) Inventors: Rishi Bhatnagar, East Brunswick, NJ (US); Mark Jorgensen, Harrison, NJ (US); Yan Tordoff, London (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/671,423

(22) Filed: May 22, 2024

Related U.S. Application Data

(60) Provisional application No. 63/546,823, filed on Nov. 1, 2023.

(51) Int. Cl.
| | |
|---|---|
| *H04L 41/16* | (2022.01) |
| *H04L 9/40* | (2022.01) |
| *H04L 41/069* | (2022.01) |
| *H04L 41/084* | (2022.01) |

(52) U.S. Cl.
CPC ............ *H04L 41/16* (2013.01); *H04L 41/069* (2013.01); *H04L 41/084* (2013.01); *H04L 63/1433* (2013.01)

(58) Field of Classification Search
CPC ..... H04L 41/16; H04L 41/069; H04L 41/084; H04L 63/1433
See application file for complete search history.

(56) References Cited

U.S. PATENT DOCUMENTS

| | | |
|---|---|---|
| 10,331,426 B1 | 6/2019 | Jarvis et al. |
| 10,891,414 B2 | 1/2021 | Gupta et al. |
| 10,997,409 B1 | 5/2021 | Krishnamurthy et al. |
| 11,194,688 B1 | 12/2021 | Featonby et al. |
| 12,047,400 B2 * | 7/2024 | Thompson .......... H04L 63/1416 |
| 2009/0049025 A1 | 2/2009 | Fay et al. |
| 2009/0300579 A1 | 12/2009 | Dutta et al. |
| 2013/0238778 A1 * | 9/2013 | Reitan ..................... H04L 41/00 709/223 |
| 2015/0324488 A1 | 11/2015 | Chandnani et al. |
| 2019/0020550 A1 | 1/2019 | Ramasamy et al. |
| 2020/0136957 A1 * | 4/2020 | Sanchez Charles .. H04L 45/124 |
| 2021/0103639 A1 | 4/2021 | Wardlaw et al. |
| 2021/0357593 A1 | 11/2021 | Oara et al. |
| 2021/0374304 A1 | 12/2021 | Janarthanam et al. |
| 2022/0173978 A1 * | 6/2022 | Metaxas ................. H04L 41/16 |
| 2022/0245475 A1 | 8/2022 | Blizzard et al. |

* cited by examiner

*Primary Examiner* — Philip C Lee
(74) *Attorney, Agent, or Firm* — K&L Gates LLP

(57) ABSTRACT

All-in-one network architecture management system develops, deploys, and maintains a network architecture, based on the specific needs of client inputs and client requirements. The network architecture management system comprises a user interface to receive initial requirements from clients, and monitors the deployed architecture to ensure that the configurations continue to meet the client's needs as throughput scales. The network architecture management system establishes a communication channel with a plurality of network services to maintain compliance, identify architecture gaps, and update architecture designs for scaling.

14 Claims, 4 Drawing Sheets

Figure 1:
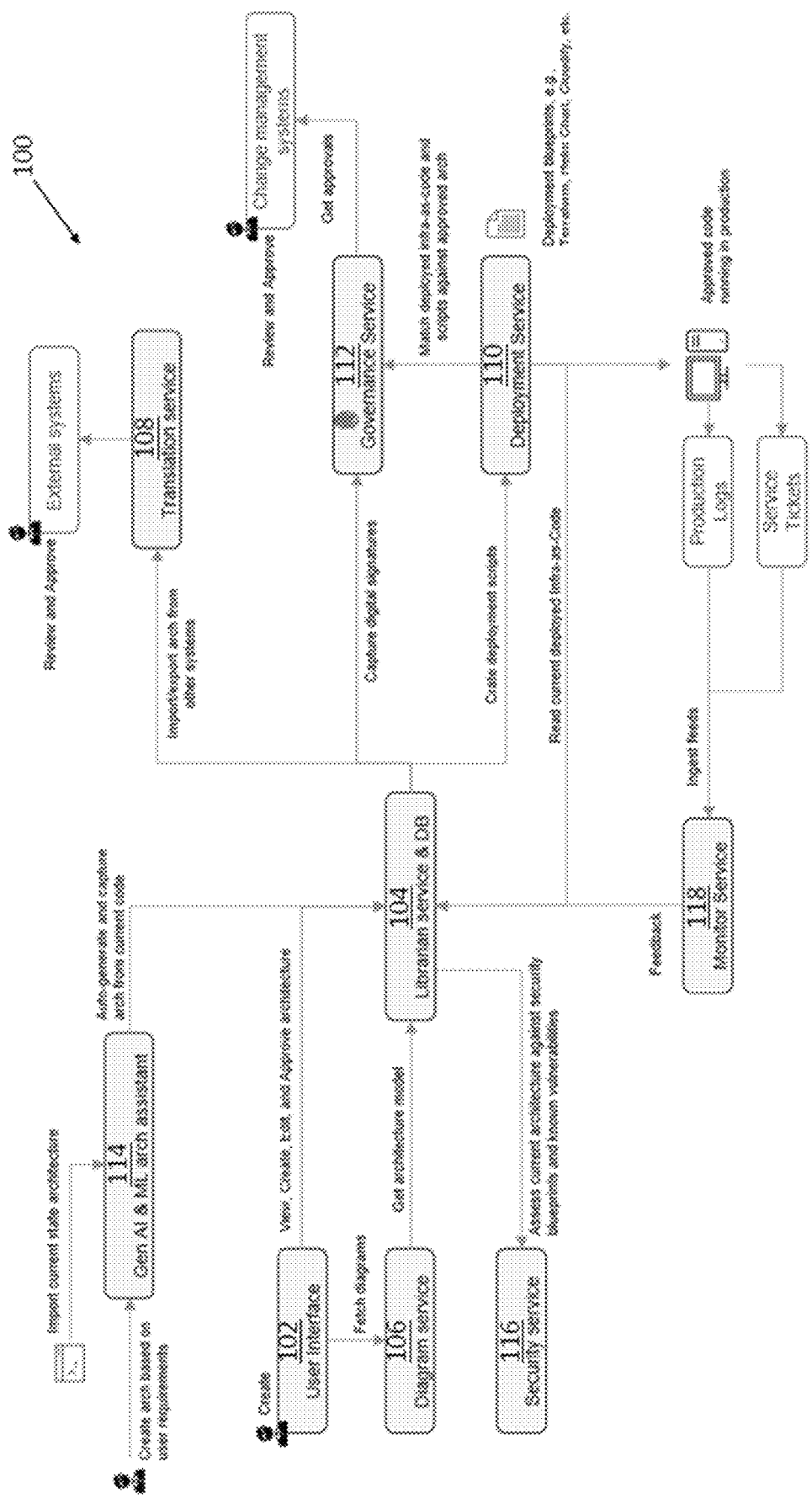

MODELLING ARCHITECTURE AS DATA WITH OPINIONATED ARCHITECTURE PATTERNS AND RECOMMENDATIONS

PRIORITY CLAIM

The present application claims priority to U.S. provisional application Ser. No. 63/546,823, filed Nov. 1, 2023, which is incorporated herein by reference.

BACKGROUND

Current network architecture systems do not provide an integrated all-in-one solution that monitors the network architecture, communicates with the necessary services to design, deploy, maintain, secure, and scale the network. Conventional systems often suffer from several issues. For example, in traditional network architecture systems, it can be very hard to ensure that only approved software is deployed throughout the network. It is also hard to identify how many systems are following an approved vs unapproved pattern or how many systems have some technical debt due to old software design. Another difficulty is generating and maintaining network architectures that accurately meet the needs of the client. This issue is further complicated by reusing existing systems with the goal of keeping their roadmap and timelines in mind. In that connection, current systems also often struggle to keep an architecture updated with the latest status.

Another issue is that each team within the network generates different views of the same artifact and represent it differently. This makes it very hard to aggregate diagrams across departments and divisions to get a larger picture. Thus, there may be disparities in the enterprise architecture views between department views and application architecture views.

Yet another issue is that current systems do not provide controls that allows for short-term tactical designs that are meant to expire (e.g., after 1 year) and require architecture reviews.

Another issue is that current systems fail to identify design flaws or missing non-functional requirements and incorporate feedback from the existing production issues into updates. For example, a system designed for a throughput of 1000 calls per second could start getting 1 M calls per second. Current system fails to capture this data, establish a feedback response, and route the feedback response to a technical design review.

Still yet another issue is that it can be hard to determine when and who should review the change. If the change is non-material, it may not require a full architecture review, but this decision is often subjective.

SUMMARY

In one general aspect, embodiments of the present invention are directed to an all-in-one network architecture system to develop, deploy, and maintain a network architecture, based on the specific needs of a client. The network architecture management system comprises a user interface to receive initial requirements (e.g., parameters) for a new or revised service or service architecture from clients/user, and monitors the deployed architecture to ensure that the configurations continue to meet the client's needs as throughput scales. Unlike conventional systems, the network architecture system can ensure software compliance throughout the system; generate and maintain the network architecture; maintain network consistency throughout the network; set expiry periods to review architecture configurations and resources; and establish log feedback systems for scalability.

There are several features that make the system according to various the present invention distinctive, including architecture scoring, software development lifecycle (SDLC) integration, virtual architect design, and feedback loops that update system configurations based on generative AI. By identifying specific changes and scoring each architecture change, the previously subjective task of deciding whether an architecture change is material can be converted into an objective decision, thus making is easier to adhere to firm's software policy. These and other benefits achievable through embodiments of the present invention will be apparent from the description that follows.

FIGURES

Various embodiments of the present invention are described herein by way of example in conjunction with the following figures.

Figure 2:
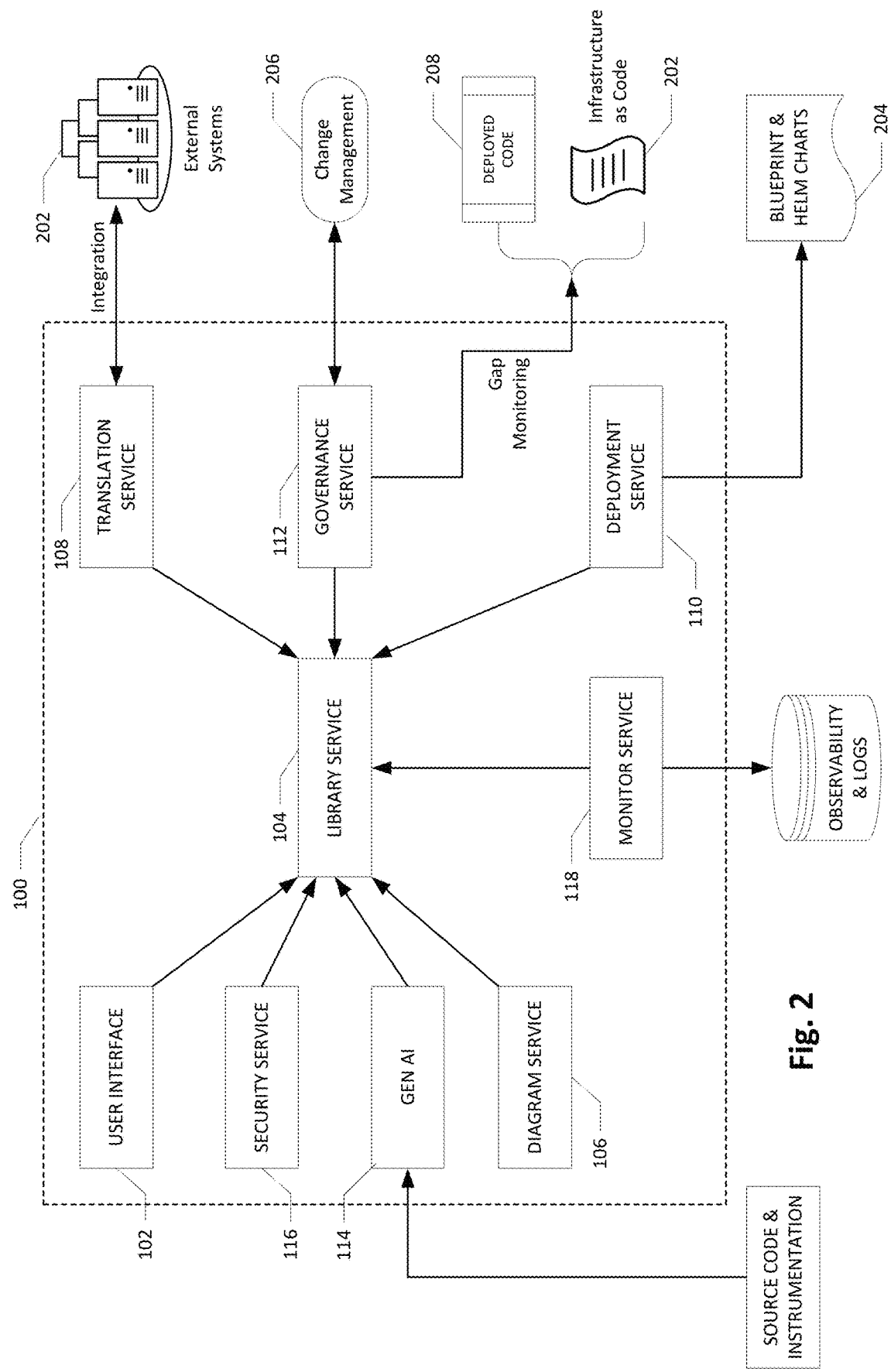
Figure 3:
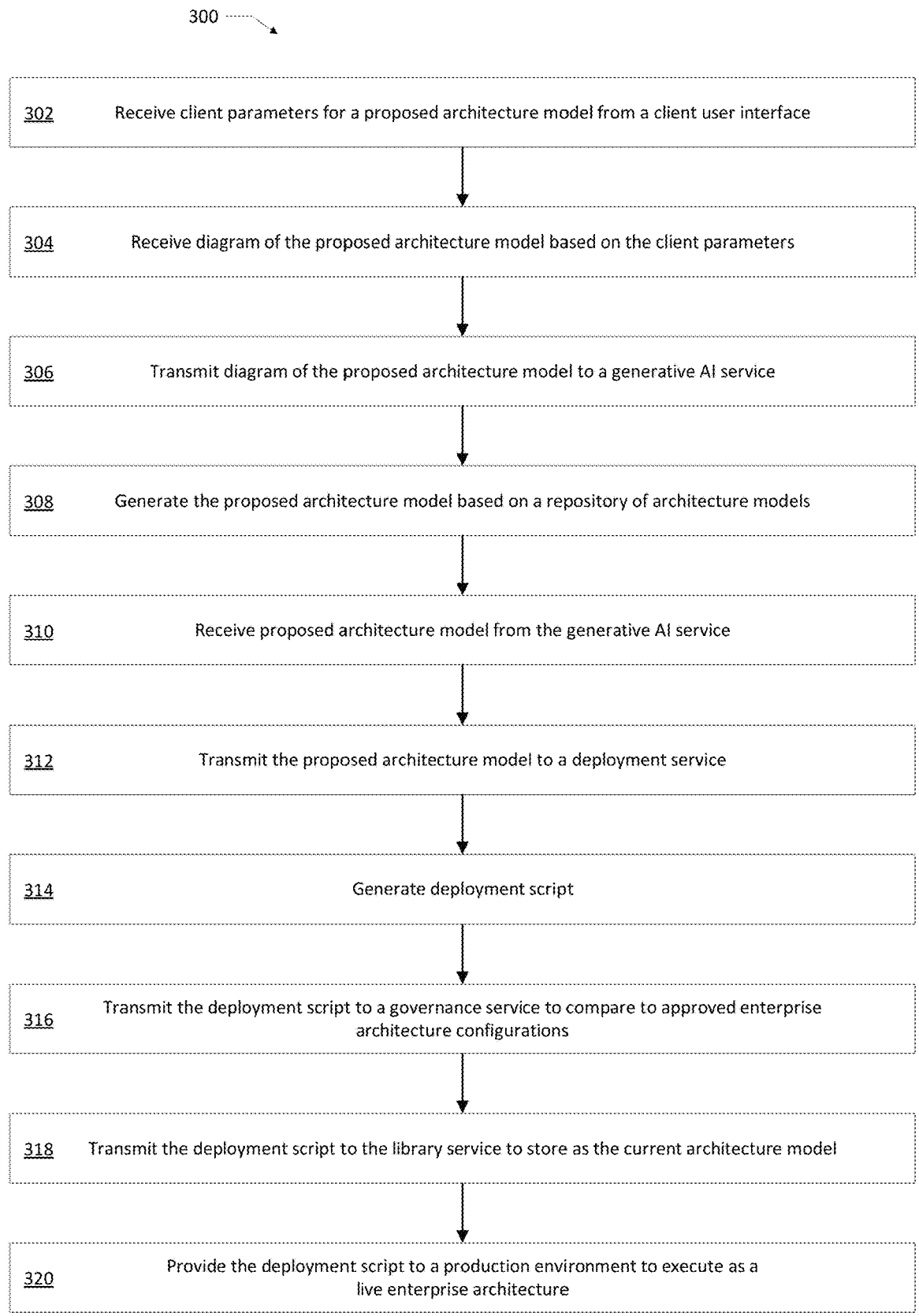

FIGS. 1 and 2 are diagrams for a network architecture system comprising a suite of services that perform different tasks related to architecture model, according to at least one aspect of the present invention. FIG. 3 is a logic flow diagram for an enterprise architecture management system 300 configured to generate and deploy an architecture model, according to at least one aspect of the present invention.

Figure 4:
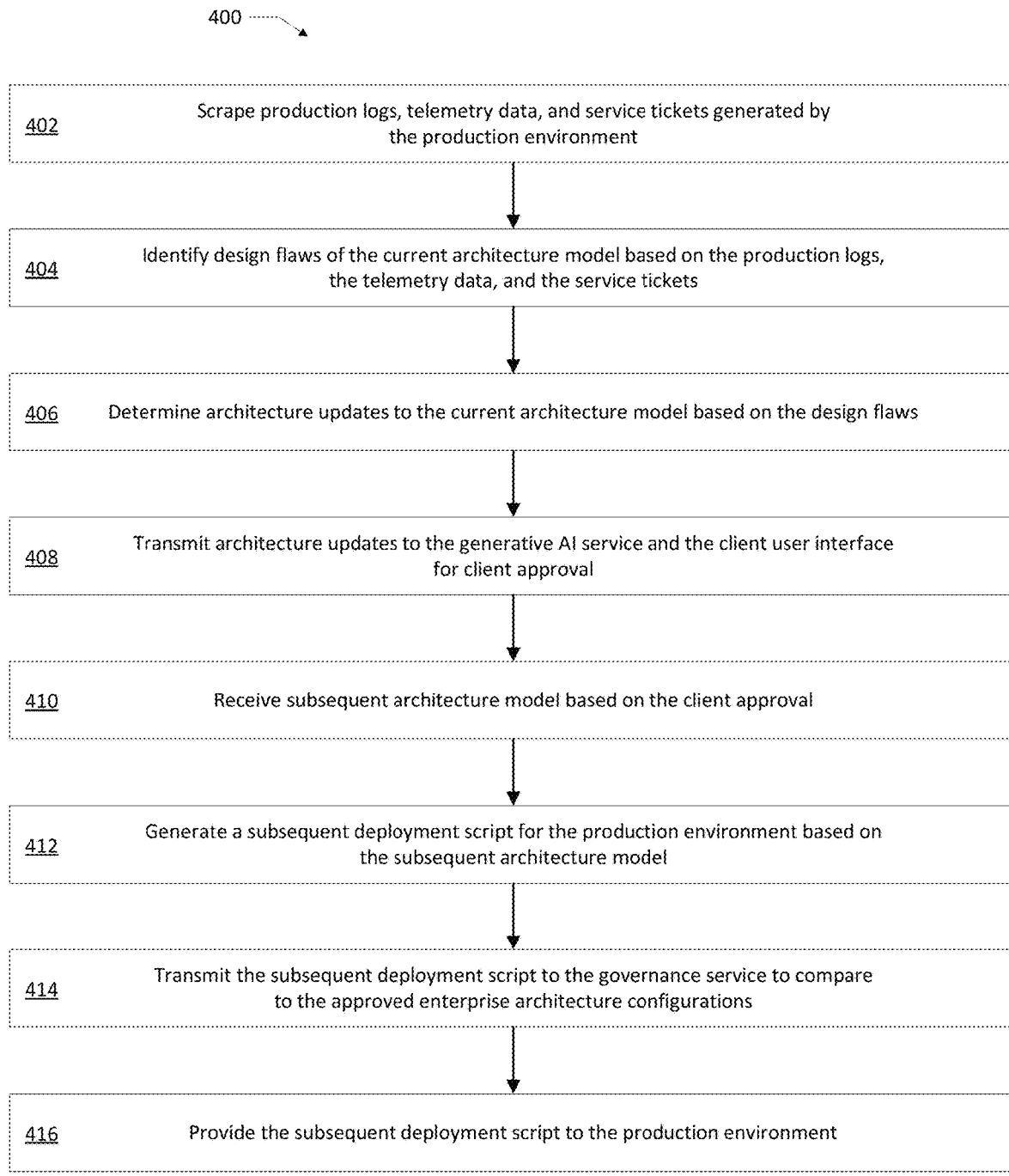

FIG. 4 is a logic flow diagram for an enterprise architecture management system configured to update an architecture model based on production environment feedback, according to at least one aspect of the present invention.

DESCRIPTION

The present invention is directed, in one general aspect, an all-in-one network architecture system to develop, deploy, and maintain a network architecture, based on the specific needs of a client. The enterprise architecture management system comprises a user interface to receive initial requirements (e.g., parameters) for a new or revised service or service architecture from clients/user, and monitors the deployed architecture to ensure that the configurations continue to meet the client's needs as throughput scales. Unlike conventional systems, the network architecture system can ensure software compliance throughout the system; generate and maintain the network architecture; maintain network consistency throughout the network; set expiry periods to review architecture configurations and resources; and establish log feedback systems for scalability.

The enterprise architecture management system may be built on an open source framework, such as C4, which refers to the "Context, Containers, Components, and Code" model, which is a way of visualizing and documenting software systems. It can still be applied in the context of understanding and documenting the architecture of networked systems or applications. Applying the C4 model involves visualizing and documenting how different networked components interact with each other, how they are deployed within containers, and how they collectively serve the overall purpose of the system while considering the broader context of users, external systems, and dependencies. However, there are several features that make the system according to various the present invention distinctive, including architecture scoring, software development lifecycle (SDLC) integration, virtual architect design, and feedback loops that update system configurations based on generative AI.

The architecture scoring, for example, allows each architecture to be reviewed against a functional and non-functional guidelines and principles of the implementing organization. This score can be used indicate if changes or designs are approved.

The SDLC integration can involve an architecture model expiry that indicates how long before the architecture has to be reviewed again. This feature can ensure that a tactical architecture is reviewed in due time to upgrade. The SDLC integration can further include bill of material comparisons and impact assessments to approve and create deployment scripts. This can ensure that the network architecture management system only deploys approved software.

Virtual architect design can include a subject matter expert recommender system that can auto-generate an architecture based on user's inputs using Generative AI. Based on the user's inputs, the Generative AI can use artificial intelligence techniques to automatically generate network designs, configurations, and/or topologies. The generative AI system may use input data to understand the requirements and constraints of the network architecture. This data could include factors such as the number of devices, types of devices (e.g., routers, switches, servers), bandwidth requirements, security requirements, and any other specifications relevant to the network design. The AI system would employ machine learning algorithms, such as deep learning or reinforcement learning, to analyze and learn from existing network architectures, best practices, and patterns. It would study how different components are interconnected, how they perform under various conditions, and what configurations lead to optimal performance. Based on the learned patterns and input data, the AI system can generate potential network architectures. This could involve creating network topologies, determining the placement of devices, defining communication protocols, and configuring network settings such as IP addresses, routing tables, and security policies. The generated network architectures could then be evaluated against predefined metrics and objectives, such as performance, reliability, scalability, and security. The AI system would preferably iteratively optimize the designs, adjusting parameters and configurations to improve the overall quality of the generated architectures. The AI system could also incorporate feedback mechanisms to learn from the outcomes of deployed network architectures. It could analyze how well the generated designs perform in real-world environments and use this information to refine its models and improve future generations. While the generative AI system may automate much of the network architecture design process, it may also allow for human intervention and guidance. Network architects and engineers could provide feedback, specify requirements, or manually adjust the generated designs as needed to align with specific business goals or operational constraints.

The feedback loops of the network architecture system could include machine learning based modules that monitor production logs, telemetry data, and service tickets to understand root causes of issued and to improve the network architecture.

In various aspects, a network architecture system according to embodiments of the present invention can generate an architecture model, capture rich meta-information about the architecture, and then auto-generate several diagrams. Beyond diagrams, the model allows for searching, filtering, layering, etc. and custom representation on the fly. The system offers more than just a diagram that represents a static picture of the architecture. The system can provide a model that allows for architecture comparison, versioning, capturing approval, etc.

FIGS. 1 and 2 illustrate aspects of an enterprise architecture management system 100 according to various embodiments of the present invention. The illustrated system 100 comprises a suite of services that perform different tasks related to the architecture model, according to various embodiments. The various services of the software system, described further below, may be implemented with monolithic and/or decomposed architectures (e.g., microservices). In monolithic architectures, the services are built where all the functionalities of the of the service/application are bundled together into a single codebase and deployed as a single unit. Microservices, on the other hand, follow a decomposed architecture, where an application is broken down into smaller, independently deployable services, each responsible for a specific function or feature. The services, whether monolithic or microservices, can vary depending on the specific requirements and scale of the application. Servers are the primary hardware used to host and run the services. The servers for the services could be part of a data center or distributed across a network. The servers for the services can range from traditional rack-mounted servers to modern blade servers or even cloud-based virtual servers. These servers provide the computing power, memory (e.g., RAM), and storage needed to execute the code and handle incoming requests. Storage devices, such as hard disk drives (HDDs), solid-state drives (SSDs), or network-attached storage (NAS) systems, can used to store data required by services and microservices. This data could include application code, databases, configuration files, logs, and user-generated content. The servers can comprise a central processing unit(s) that executes instructions (e.g., software) and processing data stored in the memory. The server may use multi-core processors to handle multiple tasks simultaneously virtualization platforms (e.g., VMware, Hyper-V) and containerization platforms (e.g., Docker, Kubernetes) provide the infrastructure for running services and microservices in isolated environments. These platforms enable efficient resource utilization, scalability, and management of distributed applications.

As illustrated in FIG. 1, the services can include a user interface 102, a database manager (or library service) 104, an architecture diagram service 106, a data translation service 108, a deployment service 110, a compliance (or governance) service 112, a generative AI interface 114, a security service 116, and a log monitoring service 118. The user interface 102 can allows users to view, create, edit, and approve an architecture for new or existing service or application to be provided by the organization. The user interface 102 can compare and show before-after version of the architecture, as well as a step-by-step migration of systems from current to target state.

The database manager 104 can provide a data repository and programmable interfaces like batch, APIs, and events to capture and store the architecture as a model. The database manager 104 can maintain the propriety object model of the network architecture for the new or revised service architecture. The database manager 104 can further be configured to: allow versioning and lifecycle management of an architecture model; maintain an expiry for the architecture after which the architecture has to be reviewed again; and store approved patterns, blueprints, and frameworks-both functional and non-functional.

The architecture diagram service 106 can be configured to convert an architecture model to diagrams. It can display packages and business capabilities expressed in a way that C4 today does not. It can allow rolling up and aggregating system diagrams into platform and enterprise diagrams, as well as providing useful filters and zooms to make the diagrams dynamic and interactive.

The data translation service 108 can be configured to translate proprietary data formats of the enterprise architecture management system 100 to and from open-source formats (e.g., C4) and other proprietary system formats. The data translation service 108 can enable the integration of external systems 202 of the enterprise with the enterprise architecture management system 100.

The deployment service 110 can be configured to interact with infrastructure-as-code 22. It can be configured to generate scripts and tickets to automate physical creation and deployment of services/systems defined in logical architecture after checking for approvals. It can also generate infrastructure-as-code (IaC) in other formats (e.g., terraform, helm charts, cloudify scripts, etc.) to create deployable blueprints 204 in multiple infrastructures (e.g., public and private cloud) as well as proprietary data centers.

IaC is an approach to managing and provisioning computing infrastructure through machine-readable definition files, rather than through manual processes or interactive configuration tools. IaC can treat infrastructure configuration in the same way developers treat application code, allowing for automation, consistency, and version control. IaC relies on definition files written in a declarative or imperative language that describe the desired state of the infrastructure. These files specify the configuration of servers, networks, storage, and other resources, as well as any dependencies or relationships between them. IaC can be implemented using specialized automation tools and frameworks that interpret the definition files and automate the provisioning, configuration, and management of infrastructure resources. Popular IaC tools include Terraform, AWS CloudFormation, Ansible, Puppet, and Chef. IaC definition files are often stored in version control systems like Git, allowing teams to track changes, collaborate on infrastructure configurations, and roll back to previous versions if needed. Version control ensures consistency and reproducibility across different environments and deployments. In various embodiments, IaC can be treated as immutable, meaning that instead of making changes to existing resources, new resources are provisioned with the desired configuration, and old resources are replaced or disposed of. This simplifies management, reduces the risk of configuration drift, and enhances reliability. IaC can also facilitate auditing and compliance efforts by providing a clear audit trail of changes to infrastructure configurations. The organization can track who made changes, when they were made, and what the changes were, helping to meet regulatory requirements and security standards.

IaC can be generated as a Helm chart by the deployment service 100, especially when deploying applications or services in Kubernetes environments. Helm is a package manager for Kubernetes that allows user to define, install, and manage Kubernetes applications. Helm charts typically include definitions of Kubernetes resources such as Deployments, Services, ConfigMaps, Secrets, Persistent VolumeClaims, etc. These resources are preferably defined in YAML files within the Helm chart's directory structure. Helm allows parameterization of configuration using values files. This means that variables can be defined for aspects of the infrastructure that may change between environments (e.g., number of replicas, image tags, environment-specific settings). This enables reusability and flexibility across different deployments. Helm can use Go templates to dynamically generate Kubernetes manifests based on the defined resources and parameter values. This allows for the creation of reusable templates that can generate different configurations based on input parameters. Helm charts can also depend on other charts, allowing composition of complex applications or services from multiple smaller components. This promotes modularity and reusability of infrastructure definitions. Helm also supports lifecycle hooks that can be used to perform actions before or after installing, upgrading, or deleting a chart. This can be useful for tasks such as database migrations, configuration updates, or integration with external systems. Helm charts can be packaged as .tgz files, making them easy to distribute and share within the organization or with the broader community. Charts can be versioned, published to repositories, and managed using Helm CLI commands.

Creating deployable blueprints from IaC can involve packaging the infrastructure configurations into a format that can be easily deployed and managed across different environments. Once the infrastructure configuration is written using the appropriate IaC tool or framework (such as Terraform, AWS CloudFormation, Ansible, or Helm) to define the resources, configurations, dependencies, and any parameterization needed for the infrastructure, the infrastructure configuration can be organized into logical modules, directories, or files based on their purpose, such as networking, compute, storage, security, etc. This makes it easier to manage and maintain your infrastructure definitions. Parameterization can be used to make the infrastructure configurations flexible and reusable across different environments. Variables or parameters for aspects of the infrastructure that may vary between deployments can be defined, such as instance types, resource sizes, or environment-specific settings. Tools like linting, syntax checking, and automated testing can be used to catch errors and validate configurations before deployment. The infrastructure configurations can then be packaged into deployable artifacts or packages. For example, if Terraform is being used, Terraform modules or workspaces can be created. If Helm is being used, the configurations can be packaged into Helm charts. The packages should include all necessary files, templates, and dependencies.

The deployment service 110 can also be configured to "read" existing architecture from various sources (e.g., terraform scripts, deployment script, and existing cloudify blueprints, existing logs, etc.) and reverse engineer existing architecture models to create a data-rich architecture model. For example, CLIs or SDK can be used to parse a script file to extract information about resources, providers, variables, outputs and dependencies defined in the script. The parsed configuration can be converted into an intermediate representation (IR) that captures the relationships between different resources, dependencies, and configurations. This IR should represent the data-rich architecture model in a structured format that can be processed and analyzed.

Still further, the deployment service 111 can be configured to cross-reference generated architectures and scripts against asset inventory to identify stale and incorrect scripts.

The governance service 112 can configured to track the lifecycle of the architecture, along with the digital signatures of each approval and systemic toll gate. In various embodiments, it can also integrate with enterprise change management systems 206 to provide impact assessment as well as provide approval and code inventory (or bill of materials) that will be deployed. The governance service 112 can also perform gap assessment of deployed architecture 208 in comparison to the approved architecture model. It can also perform scoring of architecture changes, thereby allowing redirection to the correct team for approving based on enterprise policy.

In one example, the governance service 112 determines a gap between the deployed network architecture code 208 and the approved architecture model code 202. Gaps may arise from the plurality of network services working together to deploy the architecture but may inject minor variations throughout the process. Periodic snapshots of the deployed infrastructure state can be captured using tools like Terraform's "terraform state pull" command or cloud provider APIs. This captures the current state of the infrastructure in a machine-readable format. The snapshots can then be compared with the IaC Scripts, such as with a script that parses the IaC scripts and analyzes the snapshot data. Discrepancies or differences between the deployed infrastructure and the desired state can then be identified. This could include missing resources, differences in configuration settings, or unexpected changes.

The deployed network architecture can be designed by a generative AI interface 114, rendered through the architecture diagram service 106, generated through infrastructure-as-code by the deployment server 110, and approved through the governance service 112. However, the governance service 112 can evaluate whether the deployed architecture matches the model and client requirements. Changes may be proposed to the architecture based on a score assigned by the governance service 112. The score may be determined based on enterprise policies, functional and non-functional requirements, and client intent assigned according to a scoring system. The score allows the proposed changes to be redirected to the appropriate approval team (e.g., deployment service 110) based on the enterprise policy.

The generative AI interface 114 can be configured as an architecture assistant that leverages both machine learning (ML) and Generative AI (Gen AI) to develop a network architecture model that meets the requirements of the user inputs. The generative AI interface 114 can establish architecture designs and proposes architecture changes, and preferably requires the assistance of the diagram service 106 to render the architecture diagram, approval through the governance service 112, and deployment of the code through the deployment service 110. The generative AI interface 114 may evaluate user inputs through a large language model to identify architecture requirements. The generative AI interface 114 can allow users to provide network architecture requirements and auto-generate an architecture model that meets these requirements. It will further strengthen architecture based on required non-functional requirements, such as throughput or response time. It can also retrieve sample data for ML and Gen AI with a code crawler that reads existing architecture configurations (e.g., source code, architecture meta-information, asset inventory systems, etc.) and reverse engineers architecture models to create a data-rich architecture model. The gen AI interface 114 can also evaluate and score the proposed and current architecture models against best practices, patterns, and framework-on both functional and non-functional robustness. The generative AI interface 114 can also score the architecture against industry best practices and highlight risks.

The security service 116 can be configured to quickly detect and fix security vulnerabilities. In various aspects, the security service 116 may be an infrastructure security and cyber architecture advisor. The security service 116 compares the designed and deployed architecture model against enterprise and industry security best practices, blueprints, and known vulnerabilities to network architectures.

The log monitoring service 118 can be configured as a machine learning (ML) plug-in service that scrapes production logs, telemetry data, and service tickets of existing systems and identifies problems that result from design flaws. The log monitoring service 118 can be further configured to provide architecture updates and forwards these updates to the generative AI interface 114 or the user interface 102 for human approval.

As shown in FIG. 2, the central database manager (library service) 104 can receive and store service data from the plurality services, according to at least one aspect of the present disclosure.

In various aspects, the network architecture management system operates as a cloud-based or web-based platform. The plurality of services may be deployed in a cloud computing environment and executes by a plurality of processors of the cloud computing environment. In one example, the user interface 110 may operates as a front end-interface that is deployed through a web server. A client may access the user interface 110 though a mobile application or other network connected computer device. Additionally, the network architecture management system may continue to run in an offline mode that monitors productions logs and makes architecture suggestions.

FIG. 3 is a logic flow diagram for an enterprise architecture management system 300 configured to generate and deploy an architecture model, according to at least one aspect of the present invention. The library service 104 receives 302 client parameters for a proposed architecture model from a client user interface. The library service 104 receives 304 the diagram of the proposed architecture model based on the client parameters and transmits 306 the diagram of the proposed architecture model to a generative AI service 114. The generative AI service 114 generates 308 the proposed architecture model based on a repository of architecture models. The generative AI service 114 builds the repository of architecture models by executing a crawler program to build the repository of architecture models and scoring each model of the repository of architecture models based on a plurality of industry best practices. After generative AI service 114 generates the proposed architecture model, the library service 104 receives 310 the proposed architecture model from the generative AI service and transmits 312 the proposed architecture model to a deployment service 110. The deployment service 110 generate 314 deployment script that provisions datacenter resources for the deployment of the proposed architecture model, where the deployment script is infrastructure-as-code. The deployment service 110 then transmits 316 the deployment script to a governance service 112 to compare to approved enterprise architecture configurations. The deployment service 110 also transmits 318 the deployment script to store as the current architecture model and monitor the model over time. Finally, the deployment service 110 provides 320 the deployment script to a production environment comprising a datacenter configured to execute the deployment script.

FIG. 4 is a logic flow diagram for an enterprise architecture management system 400 configured to update an architecture model based on production environment feedback, according to at least one aspect of the present invention. The monitor service 118 scrapes 402 production logs, telemetry data, and service tickets generated by the production environment, and evaluates the data for errors generated by design flaws in the architecture model. The monitor service 118 identifies 404 the design flaws of the current architecture model based on the production logs, the telemetry data, and the service tickets and determines 406 architecture updates that should be made to the current architecture model to resolve the design flaw errors. The monitor service 118 transmits 408 the architecture updates to the generative AI service 114 and to the client user interface 102 for the client's approval. Once client approves the architecture updates, the deployment service 110 receives 410 the subsequent architecture model generated by the generative AI service 114. The deployment service 110 generates 412 a subsequent deployment script for the production environment based on the subsequent architecture model and transmits 414 the subsequent deployment script to the governance service 112 to compare to the approved enterprise architecture configurations. Once the subsequent deployment script is approved by the governance service 112, the deployment service 110 can provide 416 the subsequent deployment script to the production environment to execute as a live enterprise architecture.

The computer systems of the network architecture system 100 may be implemented with one or a number of networked servers, containers, containerized applications, or Kubernetes clusters. Each server, container, or Kubernetes cluster may comprise one or more processors (e.g., CPUs or GPUs), primary data storage or memory (i.e., memory directly accessible to the CPUs/GPUs, such as RAM, ROM, registers, cache memory), secondary data storage (i.e., data storage not directly accessible by the CPUs/GPUs, such as HDDs, flash, SSDs, etc.), nearline and/or off-line storage. The computer systems may be programmed to perform the functions described herein with software modules stored in the primary, secondary, nearline, and/or off-line data storage of the computer system and executed by the processor(s) thereof. The modules' software may be implemented using any suitable computer programming language such as .NET, C, C++, JavaScript, Python, Ruby, Lua, and Perl, and using conventional, functional, or object-oriented techniques. Programming languages for computer software and other computer-implemented instructions may be translated into machine language by a compiler or an assembler before execution and/or may be translated directly at runtime by an interpreter. Examples of assembly languages include ARM, MIPS, and x86; examples of high-level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In one general aspect, therefore, the present invention is directed to a method for generating and deploying a compliant enterprise architecture model. In various embodiments, the method comprises the step of receiving, by a library service, client parameters for a proposed architecture model from a client user interface. The method also comprises the step of receiving, by the library service, a diagram of the proposed architecture model based on the client parameters for the proposed architecture model. The method can further comprise the step of transmitting, by the library service, the diagram of the proposed architecture model to a generative AI service. The method can also comprise the step of generating, by the generative AI service, the proposed architecture model based on a repository of architecture models, the client parameters and the diagram of the proposed architecture model. The generative AI service can be configured to: execute a crawler program to build the repository of architecture models; and score each model of the repository of architecture models based on a plurality of industry best practices. The method also comprises the step of receiving, by the library service, the proposed architecture model from the generative AI service. The method also comprises the step of transmitting, by the library service, the proposed architecture model to a deployment service. The method also comprises the step of generating, by the deployment service, a deployment script that provisions datacenter resources for the deployment of the proposed architecture model, where the deployment script is infrastructure-as-code. The method also comprises the step of transmitting, by the deployment service, the deployment script to a governance service, where the governance service compares the deployment script to approved enterprise architecture configurations. The method also comprises the step of providing, by the deployment service, the deployment script to the library service and a production environment, where the production environment comprises a datacenter configured to execute the deployment script. The method also comprises the step of storing, by the library service, the deployment script as a current architecture model.

In various implementations, the method can further comprise the steps of: scraping, by a monitoring service, production logs, telemetry data, and service tickets generated by the production environment; identifying, by the monitoring service, design flaws of the current architecture model based on the production logs, the telemetry data, and the service tickets; determining, by the monitoring service, architecture updates to the current architecture model based on the design flaws; transmitting, by the monitoring service, the architecture updates to the generative AI service and the client user interface for client approval, where the generative AI service generates a subsequent architecture model based on the architecture updates; receiving, by the deployment service, the subsequent architecture model based on the client approval; generating, by the deployment service, a subsequent deployment script for the production environment based on the subsequent architecture model; transmitting, by the deployment service, the subsequent deployment script to the governance service, where the governance service compares the subsequent deployment script to the approved enterprise architecture configurations; and providing, by the deployment service, the subsequent deployment script to the production environment, where the production environment executes the subsequent deployment script.

In another general aspect, the present invention is directed to an enterprise architecture management system, which can comprise a plurality of enterprise services communicably coupled in an enterprise network, with the plurality of enterprise services comprising a library service, a generative AI service, a deployment service, governance service, a monitoring service, a security service, and a client user interface. The library service is configured to: receive client parameters for a proposed architecture model from the client user interface; receive a diagram of the proposed architecture model based on the client parameters for the proposed architecture model; and transmit the diagram of the proposed architecture model to the generative AI service. The generative AI service is configured to: generate the proposed architecture model based on a repository of architecture models, the client parameters and the diagram of the proposed architecture model; execute a crawler program to build the repository of architecture models; score each model of the repository of architecture models based on a plurality of industry best practices; and transmit the proposed architecture model to the library service, where the library service forwards the proposed architecture model to the deployment service. The deployment service is configured to: generate a deployment script that provisions datacenter resources for the deployment of the proposed architecture model, where the deployment script is infrastructure-as-code; transmit the deployment script to the library service and the governance service, where the governance service compares the deployment script to approved enterprise architecture configurations, and where the library service stores the deployment script as a current architecture model; and provide the deployment script to a production environment, where the production environment comprises a datacenter configured to execute the deployment script.

In various implementations, the monitoring service is further configured to receive production logs, telemetry data, and service tickets generated by the production environment; identify design flaws of the current architecture model based on the production logs, the telemetry data, and the service tickets; determine architecture updates to the current architecture model based on the design flaws; and transmit the architecture updates to the generative AI service and the client user interface for client approval, where the generative AI service generates a subsequent architecture model based on the architecture updates. Also, the deployment service can be further configured to: receive the subsequent architecture model based on the client approval; generate a subsequent deployment script for the production environment based on the subsequent architecture model; transmit the subsequent deployment script to the governance service, where the governance service compares the subsequent deployment script to the approved enterprise architecture configurations; and provide the subsequent deployment script to the production environment, where the production environment executes the subsequent deployment script In various implementations, the library service is further configured to: determine the current architecture model has reached a predetermined expiry period; transmit the current architecture model to the security service. Also, the security service can be further configured to evaluate the current architecture model against a security blueprint, where the security blueprint comprises a plurality of known architecture configurations attributable to network vulnerabilities.

In various implementations, the security service is further configured to: generate architecture updates to the current architecture model based on identified network vulnerabilities; transmit the architecture updates to the generative AI service, where the generative AI service generates a subsequent architecture model based on the architecture updates. Also, the deployment service can further configured to: receive the subsequent architecture model based on client approval; generate a subsequent deployment script for the production environment based on the subsequent architecture model; transmit the subsequent deployment script to the governance service, where the governance service compares the subsequent deployment script to the approved enterprise architecture configurations; and provide the subsequent deployment script to the production environment, wherein the production environment executes the subsequent deployment script.

In various implementations, the security service is further configured to: receive the proposed architecture model from the library service; and evaluate the proposed architecture model against a security blueprint, where the security blueprint comprises a plurality of known configurations attributable to network security vulnerabilities.

In various implementations, the security service is further configured to: generate architecture updates to the proposed architecture model based on identified network vulnerabilities; and transmit the architecture updates to the generative AI service, where the generative AI service generates a subsequent architecture model based on the architecture updates.

In various implementations, the library service is further configured to transmit proprietary data and open source data for the current architecture model to a translation service, where the translation service converts between proprietary data formats of the current architecture model and open source formats for external systems.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method for generating and deploying a compliant enterprise architecture model, the method comprising:
   receiving, by a library service, client parameters for a proposed architecture model from a client user interface;
   receiving, by the library service, a diagram of the proposed architecture model based on the client parameters for the proposed architecture model;
   transmitting, by the library service, the diagram of the proposed architecture model to a generative AI service;
   generating, by the generative AI service, the proposed architecture model based on a repository of architecture models, the client parameters and the diagram of the proposed architecture model, wherein the generative AI service is configured to:
      execute a crawler program to build the repository of architecture models; and
      score each model of the repository of architecture models;
   receiving, by the library service, the proposed architecture model from the generative AI service;
   transmitting, by the library service, the proposed architecture model to a deployment service;
   generating, by the deployment service, a deployment script that provisions datacenter resources for the deployment of the proposed architecture model, wherein the deployment script is infrastructure-as-code;
   transmitting, by the deployment service, the deployment script to a governance service, wherein the governance service compares the deployment script to approved enterprise architecture configurations;
   providing, by the deployment service, the deployment script to the library service and a production environment, wherein the production environment comprises a datacenter configured to execute the deployment script; and storing, by the library service, the deployment script as a current architecture model.

2. The method of claim 1, further comprising:
scraping, by a monitoring service, production logs, telemetry data, and service tickets generated by the production environment;
identifying, by the monitoring service, design flaws of the current architecture model based on the production logs, the telemetry data, and the service tickets;
determining, by the monitoring service, architecture updates to the current architecture model based on the design flaws;
transmitting, by the monitoring service, the architecture updates to the generative AI service and the client user interface for client approval, wherein the generative AI service generates a subsequent architecture model based on the architecture updates;
receiving, by the deployment service, the subsequent architecture model based on the client approval;
generating, by the deployment service, a subsequent deployment script for the production environment based on the subsequent architecture model;
transmitting, by the deployment service, the subsequent deployment script to the governance service, wherein the governance service compares the subsequent deployment script to the approved enterprise architecture configurations; and
providing, by the deployment service, the subsequent deployment script to the production environment, wherein the production environment executes the subsequent deployment script.

3. The method of claim 1, further comprising:
determining, by the library service, the current architecture model has reached a predetermined expiry period;
transmitting, by the library service, the current architecture model to a security service; and
evaluating, by the security service, the current architecture model against a security blueprint, wherein the security blueprint comprises a plurality of known architecture configurations attributable to network vulnerabilities.

4. The method of claim 3, further comprising:
generating, by the security service, architecture updates to the current architecture model based on identified network vulnerabilities;
transmitting, by the security service, the architecture updates to the generative AI service, wherein the generative AI service generates a subsequent architecture model based on the architecture updates;
generating, by the deployment service, a subsequent deployment script for the production environment based on the subsequent architecture model;
transmitting, by the deployment service, the subsequent deployment script to the governance service, wherein the governance service compares the subsequent deployment script to the approved enterprise architecture configurations; and
providing, by the deployment service, the subsequent deployment script to the production environment, wherein the production environment executes the subsequent deployment script.

5. The method of claim 1, further comprising:
receiving, by a security service, the proposed architecture model from the library service; and
evaluating, by the security service, the proposed architecture model against a security blueprint, wherein the security blueprint comprises a plurality of known configurations attributable to network security vulnerabilities.

6. The method of claim 5, further comprising:
generating, by the security service, architecture updates to the proposed architecture model based on identified network vulnerabilities; and
transmitting, by the security service, the architecture updates to the generative AI service, wherein the generative AI service generates a subsequent architecture model based on the architecture updates.

7. The method of claim 1, further comprising transmitting, by the library service, proprietary data and open-source data for the current architecture model to a translation service, wherein the translation service converts between proprietary data formats of the current architecture model and open source formats for external systems.

8. An enterprise architecture management system comprising:
a server system comprising one or more servers, wherein the one or more servers host and execute code for a plurality of enterprise services that are communicably coupled in an enterprise network, wherein the plurality of enterprise services comprises a library service, a generative AI service, a deployment service, governance service, a monitoring service, a security service, and a client user interface;
the library service is configured to:
receive client parameters for a proposed architecture model from the client user interface;
receive a diagram of the proposed architecture model based on the client parameters for the proposed architecture model; and
transmit the diagram of the proposed architecture model to the generative AI service;
the generative AI service is configured to:
generate the proposed architecture model based on a repository of architecture models, the client parameters and the diagram of the proposed architecture model;
execute a crawler program to build the repository of architecture models;
score each model of the repository of architecture models; and
transmit the proposed architecture model to the library service, wherein the library service forwards the proposed architecture model to the deployment service;
the deployment service is configured to:
generate a deployment script that provisions datacenter resources for the deployment of the proposed architecture model, wherein the deployment script is infrastructure-as-code;
transmit the deployment script to the library service and the governance service, wherein the governance service compares the deployment script to approved enterprise architecture configurations, and wherein the library service stores the deployment script as a current architecture model; and
provide the deployment script to a production environment, wherein the production environment comprises a datacenter configured to execute the deployment script.

9. The enterprise architecture management system of claim 8, wherein:

the monitoring service is further configured to:
  receive production logs, telemetry data, and service tickets generated by the production environment;
  identify design flaws of the current architecture model based on the production logs, the telemetry data, and the service tickets;
  determine architecture updates to the current architecture model based on the design flaws; and
  transmit the architecture updates to the generative AI service and the client user interface for client approval, wherein the generative AI service generates a subsequent architecture model based on the architecture updates; and
the deployment service is further configured to:
  receive the subsequent architecture model based on the client approval;
  generate a subsequent deployment script for the production environment based on the subsequent architecture model;
  transmit the subsequent deployment script to the governance service, wherein the governance service compares the subsequent deployment script to the approved enterprise architecture configurations; and
  provide the subsequent deployment script to the production environment, wherein the production environment executes the subsequent deployment script.

10. The enterprise architecture management system of claim 8, wherein:
the library service is further configured to:
  determine the current architecture model has reached a predetermined expiry period; and
  transmit the current architecture model to the security service; and
the security service is further configured to evaluate the current architecture model against a security blueprint, wherein the security blueprint comprises a plurality of known architecture configurations attributable to network vulnerabilities.

11. The enterprise architecture management system of claim 10, wherein:
the security service is further configured to:
  generate architecture updates to the current architecture model based on identified network vulnerabilities; and
  transmit the architecture updates to the generative AI service, wherein the generative AI service generates a subsequent architecture model based on the architecture updates;
the deployment service is further configured to:
  receive the subsequent architecture model based on client approval;
  generate a subsequent deployment script for the production environment based on the subsequent architecture model;
  transmit the subsequent deployment script to the governance service, wherein the governance service compares the subsequent deployment script to the approved enterprise architecture configurations; and
  provide the subsequent deployment script to the production environment, wherein the production environment executes the subsequent deployment script.

12. The enterprise architecture management system of claim 8, wherein the security service is further configured to:
receive the proposed architecture model from the library service; and
evaluate the proposed architecture model against a security blueprint, wherein the security blueprint comprises a plurality of known configurations attributable to network security vulnerabilities.

13. The enterprise architecture management system of claim 12, wherein the security service is further configured to:
generate architecture updates to the proposed architecture model based on identified network vulnerabilities; and
transmit the architecture updates to the generative AI service, wherein the generative AI service generates a subsequent architecture model based on the architecture updates.

14. The enterprise architecture management system of claim 8, wherein the library service is further configured to transmit proprietary data and open source data for the current architecture model to a translation service, wherein the translation service converts between proprietary data formats of the current architecture model and open source formats for external systems.

* * * * *